Figure 1:
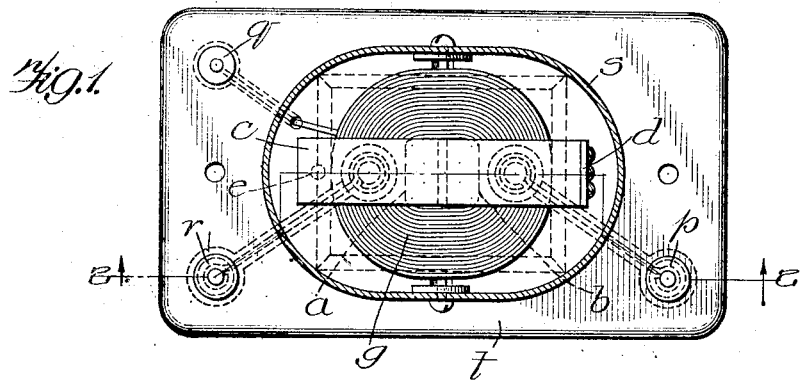

C. R. MOORE.
ELECTROMAGNET.
APPLICATION FILED MAY 24, 1913.

1,155,502.

Patented Oct. 5, 1915.

Witnesses:
Jno. H. Nelson, Jr.
Edwin Blehr

Inventor:
Charles R. Moore.
By G. L. Cragg atty.

UNITED STATES PATENT OFFICE.

CHARLES R. MOORE, OF LA FAYETTE, INDIANA.

ELECTROMAGNET.

1,155,502.  Specification of Letters Patent.  Patented Oct. 5, 1915.

Application filed May 24, 1913. Serial No. 769,755.

*To all whom it may concern:*

Be it known that I, CHARLES R. MOORE, citizen of the United States, residing at La Fayette, in the county of Tippecanoe and State of Indiana, have invented a certain new and useful Improvement in Electromagnets, of which the following is a full, clear, concise, and exact description, reference being had to the accompanying drawings, forming a part of this specification.

My invention relates to electro-magnets and has a number of objects and advantages in view.

In practising certain features of my invention the electro-magnet has two magnetic circuit portions included in different magnetic circuits and a single armature presented to both magnetic circuit portions. Each magnetic circuit portion preferably has two poles connected thereby, the armature being presented to the four poles of said magnetic circuit portions. The electro-magnet is energized by a winding common to the two magnetic circuit portions of the magnet, this winding being preferably disposed in a single coil surrounding adjacent portions of the two magnetic circuits. Such a magnet may be well employed to control a circuit in which event the magnetic circuit portions are desirably insulated from each other and the circuit to be controlled may well include the armature and one of the magnetic circuit portions brought into electrical connection with the armature when moved toward the magnet upon its energization. The magnet of my invention has been satisfactorily employed as a circuit controller for including a circuit load in circuit with the generator when proper generator voltage has been impressed upon the circuit, the winding of the magnet in such a use thereof being in bridge of portions of the load circuit conductors that are connected with the generator independently of the load, the armature of the magnet being in serial relation with the load and generator and operating to include the load in circuit with the generator when the generator voltage has risen sufficiently to afford sufficient ampere turns in the winding of the magnet to attract the magnet armature. The generator may be in the form of a power driven dynamo-electric machine or in other form such as a storage battery. In the case of a storage battery the circuit to the load is opened when the battery has been discharged to a point at which it should or can no longer supply the load. In the case of a mechanically driven generator the load will also be cut out of circuit when the voltage sufficiently drops.

My invention has for another object the provision of an electro-magnet having a spring retracted armature and a cover for the magnet and its armature which also constitutes a back stop for the armature to limit its retracting movement whereby an especially provided back stop is not required.

I will explain my invention fully by reference to the accompanying drawing showing the preferred embodiment thereof and in which—

Figure 2:
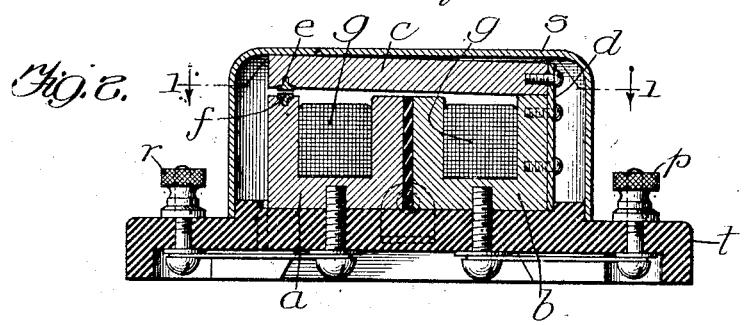
Figure 3:
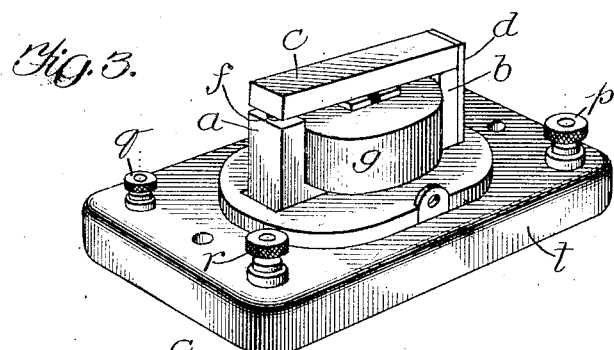
Figure 4:
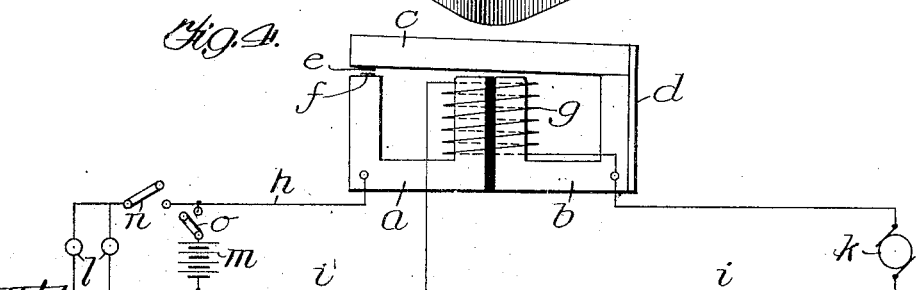

Figure 1 is a sectional plan view on line 1 1 of Fig. 2; Fig. 2 is a sectional elevation on line 2 2 of Fig. 1; Fig. 3 is a perspective view with the cover removed; and Fig. 4 is a diagrammatic view of one circuit environment in which the electro-magnet is included.

Like parts are indicated by similar characters of reference throughout the different figures.

The magnet includes two magnetic circuit portions $a$, $b$ which are insulated from each other, for the specific purpose herein disclosed, but to which separation of these portions I do not wish to be limited. Each of the magnet circuit portions $a$, $b$ is desirably U-shaped so that each portion will present two poles to a single armature $c$ which is attached at one end by means of a phosphor bronze spring $d$ to an outer pole of the magnetic circuit portion $b$, the armature overlying all of the poles and carrying a contact $e$ at its free end adapted for engagement with the contact $f$ when the armature is attracted upon energization of the magnet. When the magnet is to be employed for cutting in a load upon the attainment of the proper generator voltage, the electro-magnet winding $g$, which is preferably in the form of a single coil surrounding the adjacent limbs of the U-shaped cores, is normally in bridge of the conductors $h$ and $i$ by means of which the generator $k$ may be included in circuit with an active load $l$, such as electric lamps or in circuit with a storage battery $m$ if the generator is adapted to and may be employed for the charging of such battery.

The armature $c$ constitutes a switch which is serially included in the conductor $h$, and by means of the invention, as it is preferably practised, the conductor $h$ may directly include the left hand magnetic circuit portion $a$ as well as the right hand magnetic circuit portion $b$, in which latter event the spring $d$ is mounted so as to be in electrical connection not only with the armature $c$ but also with the magnet circuit portion $b$. When the voltage of the generator $k$ has sufficiently risen the ampere turns furnished to the magnet with the aid of the pressure winding $g$ have become sufficient to attract the armature $c$ whereupon a circuit is established traceable from the generator $k$, the right hand portion of the conductor $h$, the magnetic circuit portion $b$, the spring $d$, the armature $c$, the contacts $e$ and $f$, the magnetic circuit portion $a$, the left hand portion of the conductor $h$, thence to the generator $k$ by way of the conductor $i$ and either or both load portions $l$, $m$ according to the adjustment of the switches $n$ and $o$, under the assumption that either or both of these load portions would receive current from the generator. When the voltage is sufficiently reduced the load is excluded. Binding post $p$ serves to connect the right hand end of coil $g$, the magnetic circuit portion $b$, the armature $c$, permanently with one pole of the generator $k$. The binding post $q$ serves to connect the other terminal of the coil $g$ with the other pole of the generator $k$. The binding post $r$ serves to connect the magnetic circuit portion $a$ and the contact $f$ with the left hand section of the conductor $h$. The armature $c$ preferably does not have a usual form of back stop, the cover $s$ inclosing the magnet structure and its armature and having its top in such position with respect to the armature as to be engaged by the armature to limit its retractive movement, the cover $s$ thus itself performing the function of a back stop for the armature in addition to that of a cover or casing. The cover at its lower portion is in tight fit with an upwardly projecting flange of the base $t$ made of insulating material and upon which the entire magnet structure is mounted.

Hitherto a circuit controller employing a single magnetic circuit could have portions thereof included in the controlled circuit providing the magnetic circuit were separated into electrically distinct sections that would occasion the introduction of undesirable reluctance in such single magnetic circuit. I am able to avoid such undesirable reluctance without sacrificing the advantages in the constructions of the prior art, though the invention is not to be limited to a device through whose magnetic circuit portions a controlled circuit may be established since, by means of the construction set forth, the energizing winding will operate satisfactorily on a number of ampere turns very considerably less than the ampere turns hitherto effective in devices of the prior art.

While I have herein shown and particularly described the preferred embodiment of my invention I do not wish to be limited to the precise details of construction shown as changes may readily be made without departing from the spirit of my invention, but—

Having thus described my invention I claim as new and desire to secure by Letters Patent the following:—

A regulable electric circuit including a source of current and a circuit supplied thereby; in combination with an electro-magnet having two electrically separated magnetic circuit portions included in different magnetic circuits and each having two poles connected thereby, said electro-magnet having a single armature presented to the four poles thereof and mounted upon one magnetic circuit portion and free to be moved toward and have contact with the other magnetic circuit portion, the coil of said magnet being supplied with current from said source while the circuit supplied by said source includes one of said magnetic circuit portions, the armature, and the other magnetic circuit portion, at which latter portion the circuit is made and broken by the movement of the armature.

In witness whereof, I hereunto subscribe my name this 17 day of May A. D., 1913.

CHARLES R. MOORE.

Witnesses:
B. D. McConnell
T. H. Andrew.